United States Patent [19]

Yagi et al.

[11] Patent Number: 5,254,409
[45] Date of Patent: Oct. 19, 1993

[54] CONDUCTIVE RESIN COMPOSITE

[75] Inventors: Kiyoshi Yagi; Makoto Katsumata, both of Shizuoka, Japan

[73] Assignee: Yazaki Corporation, Japan

[21] Appl. No.: 599,716

[22] Filed: Oct. 19, 1990

[30] Foreign Application Priority Data

Oct. 26, 1989 [JP] Japan .................................. 1-277051

[51] Int. Cl.$^5$ .......................... D01F 6/18; D01F 9/12; H01B 1/06; C01B 31/04
[52] U.S. Cl. ..................................... 428/392; 428/367; 428/373; 252/502; 252/506; 528/490; 264/29.1
[58] Field of Search ................ 528/490; 252/510, 502, 252/506; 428/367, 373, 392; 264/29.1

[56] References Cited

U.S. PATENT DOCUMENTS

| 4,388,227 | 6/1983 | Kalnin | 528/490 |
| 4,414,142 | 11/1983 | Vogel | 252/206 |
| 4,957,661 | 9/1990 | Hung | 252/510 |

FOREIGN PATENT DOCUMENTS

| 0296613 | 12/1988 | European Pat. Off. |
| 0325236 | 7/1989 | European Pat. Off. |
| 1-101372 | 4/1989 | Japan |
| 1-185368 | 7/1989 | Japan |
| 61-218661 | 9/1989 | Japan |

OTHER PUBLICATIONS

European Search Report dated Jul. 29, 1991.
Patent Abstracts of Japan, vol. 13, No. 241 (C-604), Jun. 6th 1989; & JP-A-1 051 313 (Mitsubishi Kasei Corp) Feb. 27, 1989.

*Primary Examiner*—Patrick J. Ryan
*Assistant Examiner*—Richard Weisberger
*Attorney, Agent, or Firm*—Wigman, Cohen, Leitner & Myers

[57] ABSTRACT

To provide a conductive resin composite high in conductivity and moldability and low in electric resistance, intercalation compound composed of graphite fiber (having a three-dimensional crystal structure such that hexagonal net planes of carbon are arranged substantially in parallel to a fiber axis and in annular ring growth fashion) and fluorine or transition element fluoride are dispersed in synthetic resin.

19 Claims, 2 Drawing Sheets

FIG.1

TABLE 1 (MIX RATIO : WT PARTS)

| COMPOSITE NO. | | 1 | 2 | 3 | 4 | 5 | 6 | 7* | 8* | 9* | 10* |
|---|---|---|---|---|---|---|---|---|---|---|---|
| SYN RESIN | | 100 | 100 | 100 | 100 | 100 | 100 | 100 | 100 | 100 | 100 |
| INTERLAYER COMPOUND | A-1 | 150 | | | | | | | | | |
| | A-2 | | 150 | | | | | | | | |
| | A-3 | | | 150 | | | | | | | |
| | B-1 | | | | 150 | | | | | | |
| | B-2 | | | | | 150 | | | | | |
| | B-3 | | | | | | 150 | | | | |
| | C-1 | | | | | | | 150 | | | |
| | C-2 | | | | | | | | 150 | | |
| | D | | | | | | | | | 150 | |
| FIBER | | | | | | | | | | | 60 |
| CARBON BLACK | | | | | | | | | | | |
| VOLUMETRIC RESISTIVITY $10^{-3}\ \Omega \cdot cm$ | | 1.1 | 1.3 | 1.9 | 45 | 50 | 75 | 2.0 | 80 | 100 | 200 |
| ROLLER CORROSION ** | | 3 | 4 | 4 | 3 | 4 | 4 | 2 | 2 | 1 | 4 |

\* COMPARATIVE EXAMPLES

\*\* 1 : MARKEDLY DISCOLORED    2 : DISCOLORED    3 : SLIGHTLY DISCOLORED (NO PRACTICAL PROBLEM)    4 : NORMAL

FIG.2

TABLE 2 (MIX RATIO : WT PARTS)

| COMPOSITE NO. | | 11 | 12 | 13 | 14 | 15 | 16 | 17* | 18* | 19* | 20* |
|---|---|---|---|---|---|---|---|---|---|---|---|
| SYN RUBBER | | 100 | 100 | 100 | 100 | 100 | 100 | 100 | 100 | 100 | 100 |
| INTERLAYER COMPOUND FIBER | A-1 | 150 | | | | | | | | | |
| | A-2 | | 150 | | | | | | | | |
| | A-3 | | | 150 | | | | | | | |
| | B-1 | | | | 150 | | | | | | |
| | B-2 | | | | | 150 | | | | | |
| | B-3 | | | | | | 150 | | | | |
| | C-1 | | | | | | | 150 | | | |
| | C-2 | | | | | | | | 150 | | |
| | D | | | | | | | | | 150 | |
| CARBON BLACK | | | | | | | | | | | 50 |
| VOLUMETRIC RESISTIVITY $10^{-3}$ Ω·cm | | 0.28 | 0.33 | 0.48 | 11 | 12 | 19 | 0.50 | 20 | 25 | 165 |

\* COMPARATIVE EXAMPLES

CONDUCTIVE RESIN COMPOSITE

RELATED APPLICATION

This application is related to our U.S. Pat. No. entitled "High Conductivity Carbon Fiber", which was issued on May 8, 1990 and bears U.S. Pat. No. 4,923,637, or to our prior copending European Patent Application entitled the same, which was filed on Jun. 24, 1988 and bears Application No. 88 110 113.3.

BACKGROUND OF THE INVENTION

1. Field of the Invention

The present invention relates to conductive resin composite suitable for use in molding conductive articles.

2. Description of the Prior Art

With advance of electronic technology, there exists a strong demand for conductive resin composite material composed of carbon particles or carbon fiber and plastic or rubber which is light in weight, high in strength, high in conductivity, and excellent in moldability, as material for shielding static electricity or electromagnetic wave.

In the conductive resin composite material, however, since it is necessary to add a great quantity of carbon particles such as carbon black in order to reduce the resistance thereof, there exists a problem in that the viscosity of the resin material increases and therefore the moldability is deteriorated markedly. Further, there exists another problem in that the electric resistivity changes because the carbon black structure is destroyed by shearing force generated when the resin is mixed with carbon black or is molded into any given shape, and therefore it is difficult to obtain a stable electric resistivity. Further, in conductive resin composite material including carbon fiber obtained by carbonizing organic material fiber such as polyacrylonitrile and further by graphiting it, since the conductivity of the carbon fiber itself is insufficient, it is impossible to obtain a desired conductivity.

On the other hand, it has been known that resin composite low in resistivity and excellent in moldability can be obtained by adding gaseous phase growth carbon fiber (manufactured by introducing hydrocarbon and specific organic metal compound or these together with carrier gas into a reaction area, by thermodecomposing the hydrocarbon and by heat-treating it where necessary) to rubber plastic (Japanese Patent Kokai No. 61-218661). In this resin composite, however, since a large quantity of carbon fiber must be added to the resin to obtain a low resistivity resin, the moldability is deteriorated.

Further, it has been well known that the intercalation compound of graphite of gaseous phase growth carbon fiber and nitric acid or bromine is excellent in conductivity. Therefore, it has also been known that resin composite low in resistivity and excellent in moldability can be obtained by adding the above-mentioned intercalation compound to rubber or plastic (Japanese Patent Kokai Nos. 1-101372 or 1-185368). In these intercalation compound, however, there still exist other problems in that the heat resistance and therefore the heat stability are insufficient, so that the resin composite is decomposed in molding process to corrode the molding die.

SUMMARY OF THE INVENTION

With these problems in mind, therefore, it is the primary object of the present invention is to provide resin composite high in conductivity, stable in molding process, and small in change of electric resistivity without damaging molding dies.

To achieve the above-mentioned object, the conductive resin composite, according to the present invention comprises: (a) graphite fiber with crystal structure such that carbon hexagonal net planes are arranged substantially in parallel to a fiber axis and in annular ring growth fashion around the fiber axis; (b) synthetic resin kneaded with said graphite fiber so that said graphite fiber is dispersed into said synthetic resin; and (c) fluorine or transition element fluoride infiltrated to between the carbon hexagonal net planes, to form higher conductivity intercalation compound by reacting the graphite fiber with the fluorine or transition element fluoride.

The graphite fiber as the material of the composite according to the present invention can be obtained by heat-treating carbon fiber obtained by thermodecomposing hydrocarbon in gaseous phase within an inert gas atmosphere, for instance.

The carbon fiber can be obtained by the following method: hydrocarbon such as aromatic hydrocarbon such as toluene, benzine, naphthalene, etc. or aliphatic hydrocarbon sucn as propane, ethane, ethylyene, etc. or preferably benzene or naphthalene are prepared as raw material; the prepared raw material is gassified and then decomposed together with a carrier gas such as hydrogen at 900° to 1500° C., in contact with catalyst composed of ultrafine metallic particles (e.g. 100 to 300 Å particle-size iron, nickel, iron-nickel alloy, etc.) applied on a substrate made of ceramic or graphite, or in contact with catalyst composed of ultrafine metallic particles (e.g. 100 to 300 Å particle-size iron, nickel, iron-nickel alloy, etc.) dispersing and floating in a reaction zone.

The carbon fiber thus obtained is pulverized by a ball mill, rotary spindle, cutting mill, or another appropriate pulverizer according to the necessity. Although not essential, it is preferably to pulverize the carbon fiber because the moldability of the intercalation compound or the dispersibility into the resin when compounded with other materials can be improved.

Further, the pulverized carbon fiber is heat-treated at 1500 to 3500° C., more preferably at 2500 to 3000° C. for 3 to 120 min., more preferably for 30 to 60 min. within an inert gas atmosphere such as argon to obtain graphite fiber of three-dimensional crystal structure such that the carbon hexagonal net plane arrangement is substantially parallel to fiber axis and in the form of the annual ring growth crystal arrangement around the fiber axis.

The graphite fiber thus obtained is kept in contact with fluorine gas under coexistence condition with a small amount of silver fluoride at temperature 0 to 50° C. under pressure 0.5 to 2 atm. or more preferably 1 atm. for 10 min. or more to obtain an intercalation compound between the graphite fiber and fluorine, in which fluorine is infiltrated to between the carbon hexagonal net plates.

The transition element fluoride for forming an intercalation compound together with the graphite fiber is titanium belonging to the 4A Group in the periodic law table or fluoride of metallic transition element such as vanadium, niobium, etc. belonging to the 5A Group, more preferably titanium tetrafluoride or vanadium pentafluoride. In reaction between the graphite fiber and the fluoride of one of these transition elements, the graphite fiber and the transition element are kept within a fluorine gas atmosphere at 250° C. or less, under 1 atm. or less and for 10 min. or more.

The composition of the intercalation compound fiber between graphite and fluorine can be expressed as $C_6F$ or $C_{20}F$, whose iterative periodic length $I_c$ of the crystal along the c-axis direction ranges from 6 to 20 Angstrom.

The conductive resin composite of the present invention can be obtained by mixing the above-mentioned intercalation compound fiber with synthetic resin such as rubber plastic, etc. The resin material to be mixed with the intercalation compound fiber is a thermoplastic resin such as polyethylene, polypropylene, polyvinyl chloride, ethylene vinyl acetate inter polymer, ethylene-acrylic ester inter polymer; a thermosetting resin such as silicon resin, phenol resin, urea resin, epoxide resin, etc.; or synthetic rubber such as chloroprene, chlorosulfonic polyethylene, chlorinated polyethylene, ethylene-X-olefin rubber, ethylene-propylene rubber, silicon rubber, acrylic rubber, fluorine rubber, etc.

Further, a kneader such as a two-roller mill, inter mix, banbury mixer, etc. is used to disperse the intercalation compound fiber into the rubber or the plastic.

The amount of the intercalation compound fiber mixed with the synthetic resin is not limited. However, 5 to 200 parts by weight of intercalation compound fiber, preferably 10 to 100 parts by weight is mixed with 100 parts by weight of resin in the case of the molding composite from the standpoints of electric resistivity and moldability, etc. However, it is possible to increase the amount of the intercalation compound fiber in the case of composite for paint or bonding agent which requires no molding process, as far as the composite is applicable to the use.

Further, it is possible to add an additive agent such as plasticizer, solvent, filler, assistant agent, antioxidant agent, cross linking agent, etc., where necessary.

Where the conductive resin composite according to the present invention is the material suitable for molding, mold products can be obtained by selecting an appropriate method from various molding methods of extrusion molding, injection molding, transfer molding, press molding, etc. according to the material of the base resin and the shape of the molded products. Further, in the case of paint material, various methods of dipping, printing, spraying, etc. can be adopted.

BRIEF DESCRIPTION OF THE DRAWINGS

FIG. 1 is a table 1 listing the volumetric resistivity and roller corrosion state of a conductive resin composite sheet formed by mixing 150 wt. parts of intercalation compounds with 100 wt. parts of a synthetic resin in comparison between the invention compounds (Nos. 1 to 6) and the comparative compounds (Nos. 7 to 8); and FIG. 2 is a table 2 listing the volumetric resistivity formed by mixing 150 wt. parts of intercalation compounds with 100 wt. parts of a fluorine rubber in comparison between the invention compounds (Nos. 11 to 16) and the comparative compounds (Nos. 17 to 20).

DETAILED DESCRIPTION OF THE PREFERRED EMBODIMENTS

The present invention will be explained in further detail hereinbelow on the basis of Examples. However, the present invention is not limited to these Examples.

Invention Samples A (a) Production of graphite fiber A

A mullite ceramic plate on which metallic iron particles size from 100 to 300 Å were painted was placed within a horizontal tubular-shaped electric furnace kept at 1000 to 1100° C. A mixture gas of benzene and hydrogen was introduced into this furnace for vapor thermodecomposition.

The obtained carbon fiber was 2 to 10 mm in length and 10 to 50 μm in diameter. The carbon fiber thus obtained was pulverized for 20 min. with a planetary type ball mill (Model No. P-5 made by FRITSCH JAPAN CO., LTD.) by driving the motor at 500 r.p.m. The pulverized carbon fiber was kept within an electric furnace of argon atmosphere at 2960° to 3000° C. for 30 min. for graphitization. With respect to the obtained graphite fiber A, it was confirmed by an X-ray diffraction topography and an electronic microscope that the carbon hexagonal net planes were arranged substantially in parallel to the fiber axis and in annular ring growth crystal structure around the fiber axis, and the graphite fiber were pulverized down to 70 to 100 μm in length.

(b) Production of intercalation compound fiber A-1

The graphite fiber A thus obtained of 1 g was slightly mixed with silver fluoride powder of about 1 mg, put on a nickel boat within a nickel reaction tube. A high purity fluorine gas was introduced into the nickel reaction tube, after the tube had been sufficiently evacuated into a vacuum, and kept at room temperature for 72 hours under pressure of 1 atm. for reaction. Thereafter, argon was further introduced into the reaction tube to replace the inner gas with the argon gas by introducing fluorine gas into an alumina-filled absorption tower for removing the fluorine gas by absorption, to collect the intercalation compound fiber A-1. The elements of the obtained intecalation compound fiber A-1 were analyzed, and it was confirmed that the fiber A-1 had a composition of $C_{8.3}F$. The iterative periodic length $I_c$ of the crystal in the c-axis direction was measured by an X-ray diffraction topography. The measured values were 9.42 and 12.6 Angstrom, which indicated that the intercalation compound was mixed by two different compounds of stage numbers 2 and 3.

(c) Production of intercalation compound fiber A-2

The afore-mentioned graphite fiber A of 1 g was slightly mixed with metallic titanium powder of about 0.25 g, put on a nickel boat within a nickel reaction tube. A high purity fluorine gas was introduced into the nickel reaction tube, after the tube had been sufficiently evacuated into a vacuum, and kept at 170° to 180° C. for 3 hours under pressure of 0.5 atm. for reaction. Thereafter, argon was further introduced into the reaction tube to replace the inner gas with the argon gas by introducing fluorine gas into an alumina-filled absorption tower for removing the fluorine gas by absorption, to collect the intercalation compound fiber A-2. In the intercalation compound fiber A-2 thus obtained, the iterative periodic length $I_c$ of the crystal in the c-axis direction was measured by an X-ray diffraction topography. The measured values were 11.42 and 14.77 Angstrom, which indicated that the intercalation compound was mixed by two different compounds of stage numbers 2 and 3.

(d) Production of intercalation compound fiber A-3

The afore-mentioned graphite fiber A of 1 g was slightly mixed with metallic vanadium powder of about 0.25 g, put on a nickel boat within a nickel reaction tube. A high purity fluorine gas was introduced into the nickel reaction tube, after the tube had been sufficiently evacuated into a vacuum, and kept at 180° to 200° C. for 3 hours under pressure of 0.1 atm. for reaction. Thereafter, argon was further introduced into the reaction tube to replace the inner gas with the argon gas by introducing fluorine gas into an alumina-filled absorption tower for removing the fluorine gas by absorption, to collect the intercalation compound fiber A-3. In the intercalation compound fiber A-3 thus obtained, the iterative periodic length $I_c$ of the crystal in the c-axis direction was measured by an X-ray diffraction topography. The measured values were 11.02 and 14.37 Angstrom, which indicated that the intercalation compound was mixed by two different compounds of stage numbers 2 and 3.

Invention Samples B (a) Production of graphite fiber B

Metallic iron catalyzer having particle size 100 to 300 Angstrom was floated within a vertical tubular-shaped electric furnace kept at 1000 to 1100° C. through which hydrogen was passed from under. A mixture gas of benzene and hydrogen was introduced into this furnace from under for thermodecomposition. The obtained carbon fiber was 10 to 3000 μm in length and 0.1 to 0.5 μm in diameter. The carbon fiber thus obtained was pulverized in the same way as in Samples 1 for graphitization. With respect to the obtained graphite fiber B, it was confirmed by an X-ray diffraction topography and an electronic microscope that carbon hexagonal net planes were arranged substantially in parallel to the fiber axis and in annular ring growth crystal structure around the fiber axis, and the graphite fiber were pulverized down to 1 to 50 μm in length.

(b) Production of intercalation compound fiber B-1

By use of the graphite fiber B thus obtained, silver fluoride was reacted with high purity fluorine gas in quite the same procedure as in Sample A-(b) (Production of intercalation compound fiber A-1), to obtain the corresponding intercalation compound fiber B-1. The elements of the obtained intercalation compound fiber B-1 were analyzed, and it was confirmed that the fiber B-1 had a composition of $C_{8.3}F$. The iterative periodic length $I_c$ of the crystal in the c-axis direction was measured by an X-ray diffraction topography. The measured values were 9.42 and 12.6 Angstrom, which indicated that the intercalation compound was mixed by two different compounds of stage numbers 2 and 3.

(c) Production of intercalation compound fiber B-2

By use of the graphite fiber B, metallic titanium was reacted with high purity fluorine gas in quite the same procedure as in Sample A-(c) (Production of intercalation compound fiber A-2), to obtain the corresponding intercalation compound fiber B-2. It was confirmed that the obtained intercalation compound fiber B-2 had the same composition and crystal structure as those of the intercalation compound fiber A-2.

(d) Production of intercalation compound fiber B-3

By use of the graphite fiber B, metallic vanadium was reacted with high purity fluorine gas in quite the same procedure as in Sample A-(d) (Production of intercalation compound fiber A-3), to obtain the corresponding intercalation compound fiber B-3. It was confirmed that the obtained intercalation compound fiber B-3 had the same composition and crystal structure as those of the intercalation compound fiber A-3.

Comparative Samples C

The graphite fiber A of 1 g obtained in Invention Samples A was put into a 5 cc glass vessel. The vessel was cooled down to −20° C. and bromine was injected into the vessel. Thereafter, the vessel was airtightened. The vessel was kept at room temperature (23° C.) for 24 hours. The graphite fiber was put into a desicator including sodium thiosulfate and silica gel for removal of excessive bromine to obtain bromine-treated graphite fiber C-1.

Further, the graphite fiber B formed in Invention Samples B was reacted with bromine in the same way as described above, to obtain bromine-treated graphite fiber C-2.

Comparative Sample D

The graphite fiber A obtained in Invention Samples A was put into a glass vessel including fuming nitric acid of 99 % in concentration. The vessel was airtightened and kept at 23° C. for 3 hours. The graphite fiber taken out of the vessel was washed sufficiently by distilled water, and dried within a desicator, to obtain nitrio acid treated graphite fiber D.

Invention Examples 1

The intercalation compound fiber obtained in Invention Samples A or B of 150 parts by weight was mixed with ethylene vinyl acetate inter polymer of 100 parts by weight (EV250 of MITSUI Du Pont CHEMICAL Co.), respectively, kneaded by 6-inch rollers at 140° to 150° C. for 20 min., and further pressed at 170° C. by a press machine into 70 mm × 10 mm × 2 mm rubber composite sheets (Nos. 1 to 6).

Comparative Examples 1

The graphite fiber obtained in Comparative Samples C or D was mixed with ethylene vinyl acetate inter polymer, respectively and pressed into resin composite sheets (Nos. to 9) in the same way as in Invention Examples 1.

Further, since it was difficult to knead the resin composite including conductive carbon black (Ketzen Black EC made of Lion Akzo Co.) and ethylene vinyl acetate inter polymer resin, carbon black of 60 parts by weight was added to the resin of 100 parts by weight and pressed into resin composite sheets (No. 10) as a comparative example.

Test Examples 1

A conductive paint was applied as electrodes onto both ends (10 mm away from each other) of each of the resin composite sheets obtained Invention Examples 1 and Comparative Examples 1, and each electric resistance between the two electrodes was measured by a Wheatstone bridge, to calculate volumetric resistivity.

Table 1 shown in FIG. 1 lists these test results together with the surface corrosion degree of 6-inch rollers used to knead these resin composite, respectively.

Invention Examples 2

The intercalation compound fiber obtained in Invention Samples A or B of 150 parts by weight was mixed with fluororubber (AFRUS 150 E made of Nihon Synthetic Rubber Co.) of 100 parts by weight, respectively, further mixed with 4 weight part vulcanizing agent and 11 weight part vulcanization assistant, kneaded by 6-inch rollers for min., pressed at 170° C. for 10 min. by a press machine, further vulcanized secondarily at 200° C. for 4 hours into 70 mm × 10 mm × 2 mm rubber composite sheets (Nos. 11 to 16).

Comparative Examples 2

The graphite fiber obtained in Comparative Samples C or D was mixed with fluororubber, respectively and pressed into rubber composite sheets (Nos. 17 to 19) in the same way as in Invention Examples 2.

Further, since it was difficult to knead the rubber composite including conductive carbon black used in Comparative Examples 1 and fluororubber, carbon black of 50 parts by weight was added to the rubber of 100 parts by weight and pressed into rubber composite sheets (No. 20) as a comparative example.

Test Examples 2

Volumetric resistivity was measured for each rubber composite sheet obtained in Invention Examples 2 and Comparative Examples 2 in the same way as in Test Examples 1. Table 2 shown in FIG. 2 lists these test results.

In the conductive resin composite according to the present invention, since the intercalation compound obtained by reacting fluorine or transition element fluoride with graphite fiber (having a crystal structure such that carbon hexagonal net planes are arranged substantially in parallel to a fiber axis and in annular ring growth fashion) is used as conductive material, it is possible to provide stable conductive resin composite material high in moldability, without damaging a molding machine.

What is claimed is:

1. Conductive resin composite, comprising:
   (a) graphite fiber with crystal structure such that carbon hexagonal net planes are arranged substantially in parallel to a fiber axis and in annular ring growth fashion around the fiber axis, said graphite fiber including a fluorine-containing reaction compound; and
   (b) synthetic resin kneaded with said graphite fiber so that said graphite fiber is dispersed into said synthetic resin;
   wherein said reaction compound is formed by reacting fluorine or transition element fluoride with said graphite between the carbon hexagonal net planes, to form a higher conductivity intercalation compound, and
   wherein further the intercalation compound composed of graphite fiber and fluorine is graphite intercalation compound fiber having a crystal c-axis direction in which the interative periodic length of the crystal in the c-axis direction ranges from 6 to 20 Angstrom.

2. The conductive resin composite of claim 1, wherein the graphite fiber is graphited gaseous phase growth carbon fiber obtained by contact between an ultrafine metalic catalyzer carried on a substrate and a hydrocarbon compound within a non-oxidation atmospher.

3. The conductive resin composite of claim 1, wherein the graphite fiber is graphited gaseous phase growth carbon fiber obtained by contact between an ultrafine metallic catalyzer floating in a high temperature zone and a hydrocarbon compound.

4. The conductive resin composite of claim 1, wherein the intercalation compound composed of the graphite fiber and the fluorine is obtained by keeping the graphite fiber in contact with fluorine gas under a coexistence condition with a small amount of silver fluoride at 0° to 50° C. under 0.5 to 2 atm. for 10 min.

5. The conductive resin composite of claim 1, wherein the intercalation compound composed of the graphite fiber and transition element fluoride is obtained by keeping the graphite fiber in contact with transition element fluoride within a fluorine gas atmosphere at 250° C. or less under 1 atm. or less and for 10 min. or more.

6. The conductive resin composite of claim 9, wherein the transition element fluoride is vanadium pentafluoride.

7. The conductive resin composite of claim 5, wherein the transition element fluoride is vanadium pentafluoride.

8. The conductive resin composite of claim 1, wherein the intercalation compound fiber is expressed as $C_6F$ to $C_{8.3}F$.

9. The conductive resin composite of claim 1, wherein 5 to 200 parts by weight of the intercalation compound fiber is mixed with 100 parts by weight of resin in the case of molding composite.

10. The conductive resin composite of claim 1, wherein the graphite fiber is obtained by heat treating carbon fiber obtained by thermodecomposing hydrocarbon in gaseous phase within an inert gas atmosphere.

11. The conductive resin composite of claim 10, wherein the carbon fiber is obtained by gassifying and then decomposing hydrocarbon together with a carrier gas at 900° to 1500° C. in contact with a catalyst composed of ultrafine metallic particles applied on a ceramic or graphite substrate.

12. The conductive resin composite of claim 10, wherein the carbon fiber is obtained by gassifying and then decomposing hydrocarbon together with a carrier gas at 900° to 1500°C. in contact with a catalyst composed of ultrafine metallic particles dispersed and floating in a reaction gas.

13. The conductive resin composite of claim 10, wherein the hydrocarbon is benzene.

14. The conductive resin composite of claim 10, wherein the hydrocarbon is napthalene.

15. The conductive resin composite of claim 11, wherein the carrier gas is hydrogen.

16. The conductive resin composite of claim 11, wherein the ultrafine metallic particles are 100 to 300 Å in particle size.

17. The conductive resin composite of claim 10, wherein the graphite fiber having a three-dimensional crystal structure such that hexagonal net planes of carbon are arranged substantially in parallel to a fiber axis and in annular ring growth fashion is obtained by heating-treating the carbon fiber at 1500° to 3500° C. for 3 to 120 min. within an argon gas.

18. The conductive resin composite of claim 1, wherein said transition element fluoride is a metal selected from the group consisting of Group 4A and Group 5A of the Periodic Table.

19. Conductive resin composite, comprising:
(a) graphite fiber with crystal structure such that carbon hexagonal net planes are arranged substantially in parallel to a fiber axis and in annular ring growth fashion around the fiber axis, said graphite fiber including a fluorine-containing reaction compound; and
(b) synthetic resin kneaded with said graphite fiber so that said graphite fiber is dispersed into said synthetic resin;

wherein said reaction compound is formed by reacting fluorine or transition element fluoride with said graphite between the carbon hexagonal net planes, to form a higher conductivity intercalation compound, and wherein further the intercalation compound composed of graphite fiber and transition element fluoride is a graphite intercalation compound fiber having a crystal c-axis direction in which the iterative period length of the crystal in the c-axis direction ranges from 7 to 25 Angstrom.

* * * * *

UNITED STATES PATENT AND TRADEMARK OFFICE
CERTIFICATE OF CORRECTION

PATENT NO. : 5,254,409
DATED : October 19, 1993
INVENTOR(S) : Kiyoshi Yagi, et al It is certified that error appears in the above-indentified patent and that said Letters Patent is hereby corrected as shown below:

Claim 6, column 8, line 21, "claim 9," should be --claim 5,--;

Claim 6, column 8, lines 22 and 23, "vanadium pentafluoride" should be --titanium tetrafluoride--.

Claim 17, lines 64 and 65, "heating-treating" should be --heat-treating--.

Signed and Sealed this

Third Day of May, 1994

Attest:

BRUCE LEHMAN

Attesting Officer

Commissioner of Patents and Trademarks